United States Patent Office 3,817,887
Patented June 18, 1974

3,817,887
ADHESIVE STICK COMPRISING AN ALKYLATED N-VINYLPYRROLIDONE POLYMER

Thomas S. Mestetsky, Easton, Pa., assignor to
GAF Corporation, New York, N.Y.
No Drawing. Filed Mar. 9, 1972, Ser. No. 233,341
Int. Cl. C09j 3/00, 3/14
U.S. Cl. 260—23 R                    7 Claims

ABSTRACT OF THE DISCLOSURE

There are disclosed herein solid adhesive sticks which contain from 2% to about 25% by weight of a soap, and from about 5% to about 40% by weight of an alkylated N-vinylpyrrolidone polymer in water, water-miscible organic solvents and mixtures thereof, such liquids being present in an amount of from 25% to 80% by weight. The adhesive sticks have particular application as adhesives for easy to bond substrates such as paper.

---

The present invention relates to a novel solid adhesive in the form of a stick which can be manufactured at low cost and can be readily applied as an adhesive for easy to bond substrates; and more specifically, to an adhesive stick containing soap and alkylated polyvinylpyrrolidone polymers.

Adhesives now in common use for bonding easy to bond substrates such as paper, foamed polymeric styrene, cardboard, cork, photographs, album paper, scrapbooks, construction paper, Bristol board and the like, are almost all dispersions or solutions in water or other solvents. Examples of these materials are paste, animal glues and polyvinyl acetate emulsion products. While these products have good bonding properties, they have many disadvantages such as being susceptible to spillage, particularly when used by children; forming adhesive crusts which clog applicator tips and causing inefficient or esthetically displeasing glue seams. In order to overcome the disadvantages of existing adhesive materials, it has been proposed that a solid adhesive material be developed which can be readily applied by merely rubbing it on a surface of the material to be bonded. After considerable effort, such solid adhesives have been commercially developed but they have been found to exhibit very low tack. Also, these solid adhesives, during application, have been found to be stringy, thereby leaving a very uneven deposit of the adhesive on the material to be bonded.

It has been suggested in U.S. Pat. No. 3,576,776 that an adhesive applicator crayon which is easy to spread, age resistant and provides quick adhesion can be produced by using a gel formed from gel-forming salts of an aliphatic carboxylic acid having from 8 to 36 carbon atoms with a cation selected from the group consisting of alkali metals, ammonia, and lower alkylamines, with a liquid selected from the group consisting of water, water-miscible organic solvents and mixtures thereof, and an adhesive component selected from the group consisting of water-soluble and water-dispersible adhesives. For the adhesive component of the adhesive applicator crayons, known film-forming, water-soluble or water-dispersible adhesives are employed including natural as well as synthetic polymeric substances. Typical water-soluble adhesives include salts, preferably alkali metal salts of polyacrylic and polymethacrylic acids, polyacrylamides or mixed polymerizates of acrylamide with N-alkyl substituted acrylamides, as well as polyvinylpyrrolidone, particularly polyvinylpyrrolidone with a molecular weight of approximately 500,000 to 900,000. Cellulose derivatives such as methyl and ethyl cellulose, hydroxyethylcellulose, carboxymethylcellulose, degraded water-soluble starch and ethoxylated and propoxylated starch derivatives, carboxymethyl starch and the like are also disclosed as the water-soluble adhesive component. The water-dispersible adhesives include phenolic resins; alkyd resins; alkyd resins modified with linseed oil, ricinoleic acid, castor oil, soybean oil, coconut oil, tall oil, and fish oil; acrylated alkyd resins; polyvinyl acetals; polyvinyl acetates; polyvinyl butyrates; polyvinyl ethers; polyvinyl chloride; mixed polymerizate of vinyl chloride with vinylidene chlorides; as well as polyacrylic acid esters and polymethacrylic acid esters.

Although a large number of potentially useful adhesives are disclosed, the examples of the patent disclose systems in which the adhesive and soap had to be mixed together for six hours. The extreme slowness of this operation obviously severely interferes with the economic feasibility of the process disclosed in the patent.

Accordingly, it is an object of the invention to provide an adhesive applicator crayon which can be easily and economically produced.

It is a further object of the invention to provide an adhesive applicator crayon which is easy and convenient to use and which provides the required adhesion properties.

It has now been discovered that solid adhesives in the form of sticks can be made without the inherent disadvantages of existing solid adhesives by formulating the stick from soap and alkylated N-vinylpyrrolidone polymers. The adhesive stick is used by merely rubbing it on the substrate which is to be bonded.

The alkylated N-vinylpyrrolidone polymers suitable for use in preparing the adhesive sticks of the present invention are typically waxy solids at room temperature. These polymers can be prepared by homopolymerization of N-vinylpyrrolidone or a lower alkyl substituted N-vinylpyrrolidone and subsequent alkylation with an alpha-olefin of at least 2 carbon atoms, and preferably of from about 4 to about 30 carbon atoms. Also, these polymers can be prepared by copolymerization of N-vinylpyrrolidone with an alpha-olefin of at least 2 carbon atoms and preferably of from about 4 to about 30 carbon atoms. It has been found that the average molecular weight of the polymers which are waxy solids at room temperature is generally above about 7,500 and preferably ranges from about 8,000 to about 200,000. The molecular weight of the polymer can be readily determined by relative viscosity measurements as described in Modern Plastics, 23 No. 3, 157–61, 212, 214, 216 and 218 (1945). It has also been found that adhesive sticks which apply easily and uniformly can be obtained when the alkylated N-vinylpyrrolidone polymers contain from about 10 to about 50 percent by weight of alkyl groups. Examples of alkylated N-vinylpyrrolidone polymers which can be employed to prepare the adhesive sticks of the present invention as well as methods for the preparation of such polymers are described in U.S. Pat. Nos. 3,417,054; 3,423,367; 3,423,381 and 3,479,417 which are incorporated herein by reference.

The adhesive is employed in conjunction with a soap which serves as a gel-forming substance. The gel-forming substances which are suitable are the alkali metal, ammonia and lower alkylamine salts of aliphatic carboxylic acids.

The terms "aliphatic carboxylic acids" is intended to include compounds such as naphthenic acids which are carboxylic acid derivatives of polyalkyl-substituted cyclopentanes and cyclohexanes.

The aliphatic carboxylic acids having from 8 to 36 carbon atoms utilized as the gel-formers can be either branched or straight chain and may contain double bonds or single substituents such as chloro or bromo. Preferably the aliphatic carboxylic acids having from 8 to 36 carbon atoms should be alkanoic acids, alkenoic acids, alkadienoic acids and their monohalogen substituted acids and particularly fatty acids with 12 to 22 carbon atoms. These can be obtained from natural fats or oils. The alkali metal, ammonium and lower alkyl ammonium salts of the carboxylic acids are generally water soluble. Particularly favorable results are obtained with sodium stearate. Generally, the sodium salts of the other fatty acids with about 12 to 22 carbon atoms are preferred as well. However, the lithium salts, potassium salts or ammonium salts, possibly substituted by lower alkyl radicals can also be utilized as the gel-forming ingredient.

In the preparation of the gel which forms the shape-giving base of the adhesive applicator crayon, the alkali metal, ammonia and lower alkylamine salts of the aliphatic carboxylic acids are dissolved in water and/or water-miscible organic solvents. In addition to mixed aqueous solvents, water or water-miscible organic solvents alone can be employed. Preferred for the preparation of the gel are aqueous systems. The most suitable organic solvents are primarily lower monohydric and polyhydric alcohols for instance, water-miscible lower alkanols, such as methanol, ethanol, isopropanol; water-miscible lower alkanediols, such as ethylene glycol and water-miscible lower alkanetriols, such as glycerine. Butanols, amyl alcohols and benzyl alcohol as well as dioxane, acetonitrile, tetrahydrofuran, dimethylformamide or dimethylsulfoxide are also useful in small amounts. Moreover, as water-miscible organic solvents, ketones, preferably lower alkanones, such as acetone, methyl ethyl ketone are also suitable.

The content of the gel-forming substance, that is, in particular, the alkali metal, ammonia and lower alkyl-amine salts of the aliphatic carboxylic acids, ranges from about 2% to 25%, and preferably from about 5 % to 8%. The liquid component of the gel ranges from about 25% to 80%, and preferably from about 30% to 70%. The amount of the adhesive substance ranges from about 5% to 40%, and preferably from about 20% to 35%. The percentages given herein are percents by weight and refer to the total of the gel-forming substance of the liquid components and of the adhesive substance.

Unlike the systems of the prior art as exemplified by the aforementioned U.S. Pat. 3,576,776, the alkylated N-vinylpyrrolidone polymer-aliphatic carboxylic acid salt system of the present invention can be thoroughly mixed in a matter of minutes.

Another important advantage of the present adhesive stick is that it is compatible with many types of additives. Thus, the adhesive stick can be formulated to obtain a predetermined feature. This is particularly important where a water-dispersible stick is required. In this case, a water-soluble surfactant can be incorporated into the formulation in an amount effective to give the desired water dispersion characteristic. Excellent results are obtained when the surfactant is nonionic, although anionic, ampholytic and zwitterionic compounds can also be employed. The surfactants are well known and patent and printed literature are replete with disclosures of such compounds. Typical of such literature are "Surface Active Agents" by Schwartz and Perry, Interscience Publishers, New York (1958), and "Surface Active Agents and Detergents" by Schwartz, Perry and Berch, Interscience Publishers, New York (1958), the discolsures of which are incorporated herein by reference.

The tack of the adhesive stick can be improved by adding up to about 50% by weight and preferably, from about 10% to 30% by weight of any of the available tackifiers such as polybutene, polyvinyl isobutyl ether, indene resins, terpene polymer resins, low molecular weight copolymers of olefins and vinylpyrrolidones, phenol resins, resorcinol-formaldehyde resins and rosin or its ester. The only requirements as to the choice of the tackifier employed is that it be a viscous liquid or tacky semi-solid, hereinafter referred to as a pseudo-solid at room temperature and be compatible with the polymer and soap.

Aside from the above-named components, the adhesive applicator crayon of the present invention can also contain other adjuvants. As such come into consideration, for instance, adhesive resins such as colophony, cumarone, indene, furan, ketone, maleate, and sulfonamide resins as well as urea, melamine or phenolic resins.

Further adjuvants, plasticizers or moisture retainers such as for instance, tri- and tetramethyleneglycol, sorbitol, mannitol, glycose, ethoxylated glucose and lower molecular weight polyethyleneglycols with a molecular weight up to approximately 4,000 can be employed. Glycerine or ethylene glycol also act as plasticizers when employed as the liquid component. These substances are conducive to an easy, soft rubbing.

Other additives can also be used in the adhesive stick such as extenders including inorganic pigments, dyes and antioxidants which will serve as a stabilizer during the blending of the ingredients.

The following examples will further illustrate the present invention without, however, limiting the same thereto. Unless otherwise stated, all percentages and parts in the examples are by weight.

EXAMPLE I 47.5 grams of water, 15 grams of sodium stearate, and 2.5 grams of glycerine are heated to 90° C. in a steam bath. After the mixture has reached uniformity, 35 grams of a graft polymer of 10% by weight of a $C_4$ alkyl onto 90% by weight of polyvinylpyrrolidone is added gradually to the mixture and mixed until the mixture became uniform. The total mixing time is 1,600 seconds.

By way of comparison, the procedure of Example I is repeated using a polyvinylpyrrolidone having a molecular weight of approximately 700,000 (K—value of approximately 84). The total mixing time is 18,000 seconds.

The mixture of Example I, and the K–84 polyvinylpyrrolidone (PVP) mixture are poured into containers such as employed for lipstick. The K–84 PVP mixture is much more viscous and difficult to pour than the Example I mixture. After cooling, both mixtures form firm sticks and give equal bonding.

By way of further comparison, polyvinylpyrrolidone of lower molecular weight (K–60) is tried in place of the K–84 PVP. The resultant adhesive stick is too soft.

The use of a K–90 PVP results in an adhesive stick which is too stringy and which requires a long time for the mixing operation.

EXAMPLE II

In a 2-liter three-neck-flask equipped with a stirrer, 470 grams of water, 140 grams of glycerine and 70 grams of sodium stearate are added and heated under reflux to approximately 90° C. under stirring. After approximately 1 hour, the sodium stearate goes into solution. Subsequently, about 320 grams of a $C_4$ alpha-olefin-N-vinylpyrrolidone copolymer containing 10% by weight of $C_4$ alkyl groups is added to the solution. The total mixing time is about 2,160 seconds. After appropriate molding, a satisfactory adhesive stick is obtained.

It is stated, as for example, in U.S. Pats. 3,479,417 and 3,423,381, that graft copolymers of an alpha-olefin of at least two carbon atoms and N-vinyl-2-pyrrolidone are water soluble. As the chain length and percent of alkylation (weight percent of alkyl groups on an N-vinylpyrrolidone moiety) increase, aliphatic and aromatic solubility of the copolymer increases.

Thus, although it would appear that using alkylated N-vinylpyrrolidone polymers in combination with the salts of aliphatic carboxylic acids of U.S. 3,576,776, would not improve mixing time because of the trade-off of water solubility for aliphatic solubility, it is seen from the foregoing examples that, in fact, mixing time can be dramatically improved.

It is considered important that the alkylated N-vinylpyrrolidone polymers employed in the present invention be water dispersible, and provide a proper balance between water insolubility and aliphatic insolubility. The balance can be controlled by proper selection of the alpha-olefin employed and the percent alkylation of the N-vinylpyrrolidone polymer. For example, with $C_2$ to $C_{16}$ alkyl groups, up to 500 mole percent alkylation can be employed without rendering the polymer either substantially water insoluble or aliphatic insoluble. With alkyl groups containing 16 or more carbon atoms, the weight percent alkylation must be less than about 50% to maintain the necessary balance between water insolubility and aliphatic insolubility.

Other modifications of the present invention will occur to those skilled in the art upon a reading of the present disclosure. These are intended to be included within the scope of this invention.

What is claimed is:

1. In a solid adhesive stick comprising, approximately by weight based on the total weight of components I, II and B,
    (A) a shape-giving base consisting essentially of a gel of
        (I) 2% to 25% of a gel-forming alkali metal, ammonia, or lower alkylamine salt of a $C_{8-36}$ aliphatic carboxylic acid, and
        (II) 25% to 80% of water, water-miscible organic solvents, or mixtures thereof, and
    (B) 5% to 40% of a film-forming water-soluble or water-dispersible adhesive,
the improvement comprising employing as component (B) an alkylated N-vinylpyrrolidone polymer having an average molecular weight of from about 7,500 to about 200,000 and containing about 10% to about 50% by weight of alkyl groups which contain about 2 to 30 carbon atoms.

2. The solid adhesive stick of claim 1, wherein the salt of an aliphatic carboxylic acid is a sodium salt of an aliphatic carboxylic acid containing from about 12 to 22 carbon atoms.

3. The solid adhesive stick of claim 2, wherein the salt of an aliphatic carboxylic acid is sodium stearate.

4. The solid adhesive stick of claim 1, additionally containing a water-soluble surfactant.

5. The solid adhesive stick of claim 1, additionally containing up to about 50% by weight of a tackifier which is a pseudo-solid at room temperature and is compatible with the polymers and the salt of an aliphatic carboxylic acid.

6. The solid adhesive stick of claim 1, wherein the alkyl groups within the alkylated N-vinylpyrrolidone polymer contains from 2 to 16 carbon atoms and the polymer is alkylated up to 500 mole percent.

7. The solid adhesive stick of claim 1, wherein the alkyl groups within the alkylated N-vinylpyrrolidone polymer contains from 16 to 30 carbon atoms and the weight percent alkylation of the polymer is less than 50%.

References Cited

UNITED STATES PATENTS

| | | | |
|---|---|---|---|
| 3,576,776 | 4/1971 | Muszik et al. | 260—22 R |
| 3,479,327 | 11/1969 | Merijan | 260—23 R |

DONALD E. CZAJA, Primary Examiner

RONALD W. GRIFFIN, Assistant Examiner

U.S. Cl. X.R.

117—122 PA, 161 R, DIG 1; 260—29.6 R, 29.6 PM, 33.4 R